United States Patent [19]

Bolner

[11] 4,435,023
[45] Mar. 6, 1984

[54] INTERNALLY ACTUATED SPERICAL BEARING

[75] Inventor: Thomas E. Bolner, Fayetteville, Tenn.

[73] Assignee: Thiokol Corporation, Chicago, Ill.

[21] Appl. No.: 260,941

[22] Filed: May 6, 1981

[51] Int. Cl.³ .............................................. F16C 11/06
[52] U.S. Cl. ................................ 308/2 R; 239/265.35
[58] Field of Search .................... 308/36.3, 61, 72, 58, 308/2 R; 239/265.35, 265.33, 265.19; 33/397

[56] References Cited

U.S. PATENT DOCUMENTS

| | | | |
|---|---|---|---|
| 1,889,114 | 11/1932 | Smith et al. | 33/397 |
| 3,446,437 | 5/1969 | McCullough et al. | 239/265.35 |
| 3,659,788 | 5/1972 | Oldfield et al. | 239/127.1 |
| 3,727,843 | 4/1973 | Parilla | 239/265.35 |
| 3,912,172 | 10/1975 | Bolner | 239/265.35 |

*Primary Examiner*—Lenard A. Footland
*Attorney, Agent, or Firm*—Gerald K. White

[57] ABSTRACT

An internally actuated spherical bearing having particular utility for vectoring the thrust produced by the propulsion system of a rocket propelled vehicle comprises, in single axis-rotation nozzle structures, a pair of elongated kidney loop seal actuators that are arranged in end-to-end relation with each actuator wrapped around approximately 180° of the inner race in each semi-circle, the ends of each actuator being disposed at spaced positions proximate the pivotal axis of the inner race. For omni axial rotation nozzles the bearing includes a pair of such actuators to effect nozzle rotation on the pitch axis, and further includes a second pair of elongated kidney loop seal actuators to effect nozzle rotation on the yaw axis, each of the yaw actuators also being wrapped in end-to-end relation around approximately 180° of the bearing in each semi-circle with the latter semi-circles being in a plane proximate to the plane containing the pitch axis semi-circles but angularly displaced 90° therefrom.

13 Claims, 8 Drawing Figures

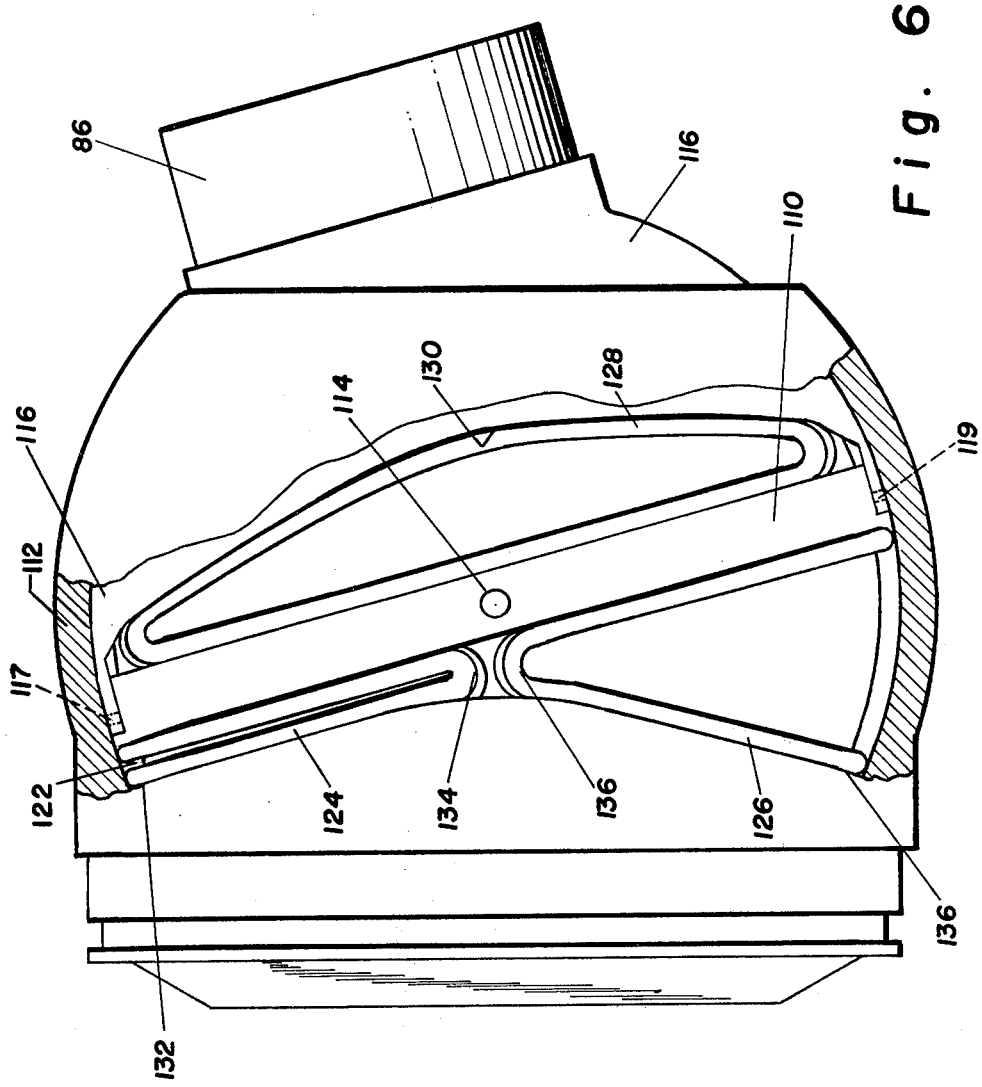

INTERNALLY ACTUATED SPERICAL BEARING

BACKGROUND OF THE INVENTION

1. Field of the Invention

The present invention relates to spherical bearings, having a ball or inner race that is pivoted for rotation in a static member forming a socket or outer race, and more particularly, to an improvement in such bearings that includes a "self-actuation" system provided internally thereof for deflecting the ball for rotation in a single plane, or if desired, in more than one place, as in a universal joint. The invention has especial utility for turning, or vectoring, the thrust produced by the propulsion system of a rocket propelled vehicle to change the direction of flight.

2. Description of the Prior Art

Thrust vector control systems for rocket propelled vehicles are known in the prior art in which the nozzle, including the nozzle throat and expansion cone, are pivoted, being carried by a spherical bearing, so that the rocket motor can be deflected to steer the vehicle.

Systems of this type including hydraulic cylinders that are positioned externally of the nozzle for deflecting the nozzle to change the direction of flight of the vehicle are disclosed in U.S. Pat. No. 3,049,877 granted to A. Sherman on Aug. 21, 1962 and U.S. Pat. No. 3,230,708 granted to D. H. Huang et al on Jan. 25, 1966, both of which patents are assigned to the assignee of the present invention. Such externally actuated thrust vector control systems are subject to a number of disadvantages from the standpoints of cost, weight, high actuation requirements, difficulty in packaging within the envelope of the rocket motor, and mechanical complication.

A thrust vector control system in which the nozzle is carried by the ball or race of a spherical bearing, and which includes a "self-actuation" or an internal actuation system for deflecting the nozzle to steer the vehicle, is disclosed in my U.S. Pat. No. 3,912,172 granted Oct. 14, 1975, and also assigned to the assignee of the present invention. The internal actuation system there disclosed includes a kidney shaped loop seal as an actuator in each quadrant of the spherical bearing, a flat tension band of stainless steel being provided around the entire perimeter of each kidney seal. Each kidney seal is captured, in its individual quadrant, within an annular chamber or space that is provided externally of the bearing outer race or socket, between a fixed wall on an external surface of the static member forming the socket, and a movable wall that is formed by the facing edge of an actuator concentric shell portion or actuator ring that is mounted on and is fixedly attached to the nozzle, the actuator ring being disposed in slidable relation with the external surface of the member forming the socket. One side of each kidney seal abuts against the said external surface and the other side abuts against the movable wall on the actuator ring, the circular ends of each kidney seal being free to move as the ball is rotated in the socket. The kidney seal actuators may also be employed in each quadrant of the spherical bearing in order to provide the function of a double acting actuator. U.S. Pat. No. 3,912,172 also includes a pressurized lubrication system for the bearing to balance the pressure load on the nozzle joint by the combustion chamber pressure as the latter acts upon the projected area of the nozzle.

Primary advantages of the self-actuation or internal actuation system of U.S. Pat. No. 3,912,172, as compared with the externally actuated spherical bearings mentioned hereinbefore, are their compactness, simplicity, economy and lower actuation requirements.

It has been found, however, that the torque developed by internal actuators such as those disclosed in U.S. Pat. No. 3,912,172, with constant actuation pressure, is inversely proportional to the magnitude of the bearing rotation, that is to say, the magnitude of the angle through which the bearing is rotated. The maximum torque that can be developed with such internally actuated bearings, accordingly, is a function of bearing rotational design requirements. Therefore, it follows that a bearing of given envelope intended for 5 degrees of rotation will have "longer" kidney seals than a bearing proposed for 15 degrees of rotation; and the torque available to drive the 5 degree bearing will be much greater than that available to drive the 15 degree bearing.

SUMMARY OF THE INVENTION

An object of the invention is to provide an improvement in a self-actuation or internal actuation spherical bearing that renders the maximum torque that can be developed independent of the extent of bearing rotation.

Another object of the invention is to provide such an improvement in an internal actuation spherical bearing that allows the ball or inner race of the bearing to be supported on a lubricated tetrafluoroethylene pad, thereby dispensing with the need for a lubrication system as required by the prior art internal actuated spherical bearings.

A further object of the invention is to provide such an improved internally actuated spherical bearing that is capable, when applied to a use not involving the passing through it of hot gases, of allowing rotation of the ball or inner race through ninety degrees (90°) or more.

In accomplishing these and other objectives of the present invention, there are provided elongated expansible peripheral loop seal actuators, referred to hereinafter also, as kidney loop seal actuators, for an internally actuated spherical bearing that are configured to wrap around approximately 180° of the ball or inner race, that is, a kidney seal actuator substantially embracing an associated semicircle of the ball. As a consequence, the effective area of each kidney seal actuator no longer is a function of the extent of bearing rotation. Additionally, the effective area, for a given envelope, is more than doubled when compared with the prior art quadrant (4 seal) configuration.

A feature of the present invention is that the use of a steel retainer band is not critical, being employed, if at all, over only a small segment of each kidney seal. The prior art internal actuated systems, as noted above, utilize a steel retainer band over the entire perimeter, and actuator ring, and a kidney seal to make up an internal actuator assembly, the circular ends of each kidney seal being free to move as the bearing is rotated.

In accordance with the present invention, the restraint for the internal kidney seal actuators is provided by the material of the ball and of the socket of the nozzle. The ends of each kidney seal actuator are restrained. If desired, steel retainer bands would be employed on the end loops or circles only. As those skilled in the art will understand, this removes a potential stress problem with the steel retainer bands encountered at relatively large vector angles, that is, angles greater than 10°.

A further feature of the actuator of the present invention is the requirement for single plane actuation only with respect to each kidney seal. This allows the kidney seals to be wrapped further around the movable ball of the spherical bearing (approximately 180°) than in the systems of the prior art having an actuator in each quadrant. Additionally, the blow off loads can be reacted on thrust pins, and bearings, spaced 180° apart on the axis of rotation of the nozzle. The prior art systems, as noted, require lubrication seals, or double kidney seals to handle the blow off loads.

Another feature of the present invention is its provision for omni-axial capability, allowing large vector angles approaching 90° and greater, in any omni-axial plane.

DESCRIPTION OF THE DRAWINGS

FIG. 6 is a view similar to FIG. 5 but showing the nozzle pitched up by pressurization of the lower kidney seal and venting the upper seal;

DESCRIPTION OF THE PREFERRED EMBODIMENTS

Figure 1:
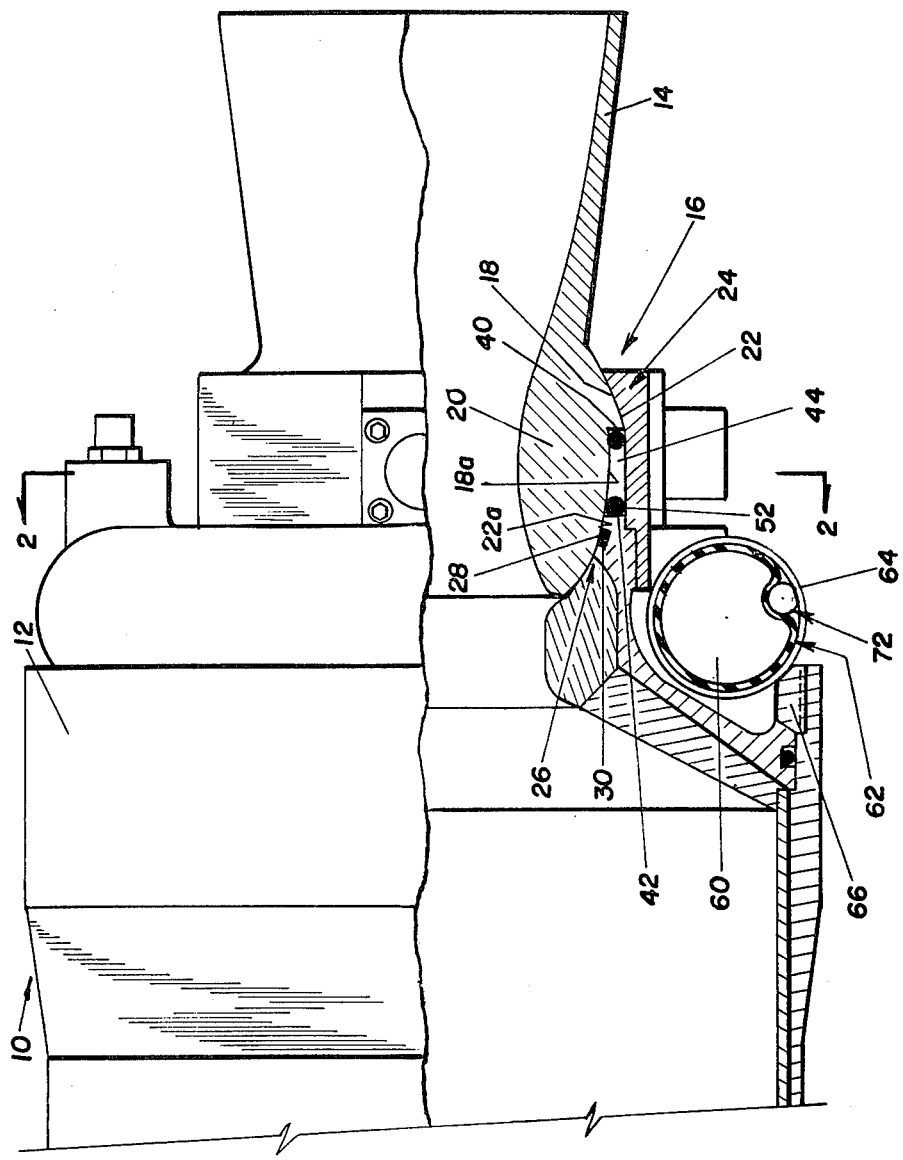
FIG. 1 is a longitudinal view, partly in section, of the aft end of a rocket motor including a portion of the case therefor and a single axis-rotation nozzle and incorporating the internal actuated spherical bearing of the present invention.

Preferred embodiments of the internally actuated spherical bearing of the present invention are shown in the drawings, being illustrated in connection with a rocket motor having a ball and socket joint mounted movable nozzle. The invention is useful, however, in other applications of self-actuation or internal actuated spherical bearings where it is important to rotate the ball through 90° or more and/or to develop maximum torque independently of the extent of bearing rotation.

Figure 2:
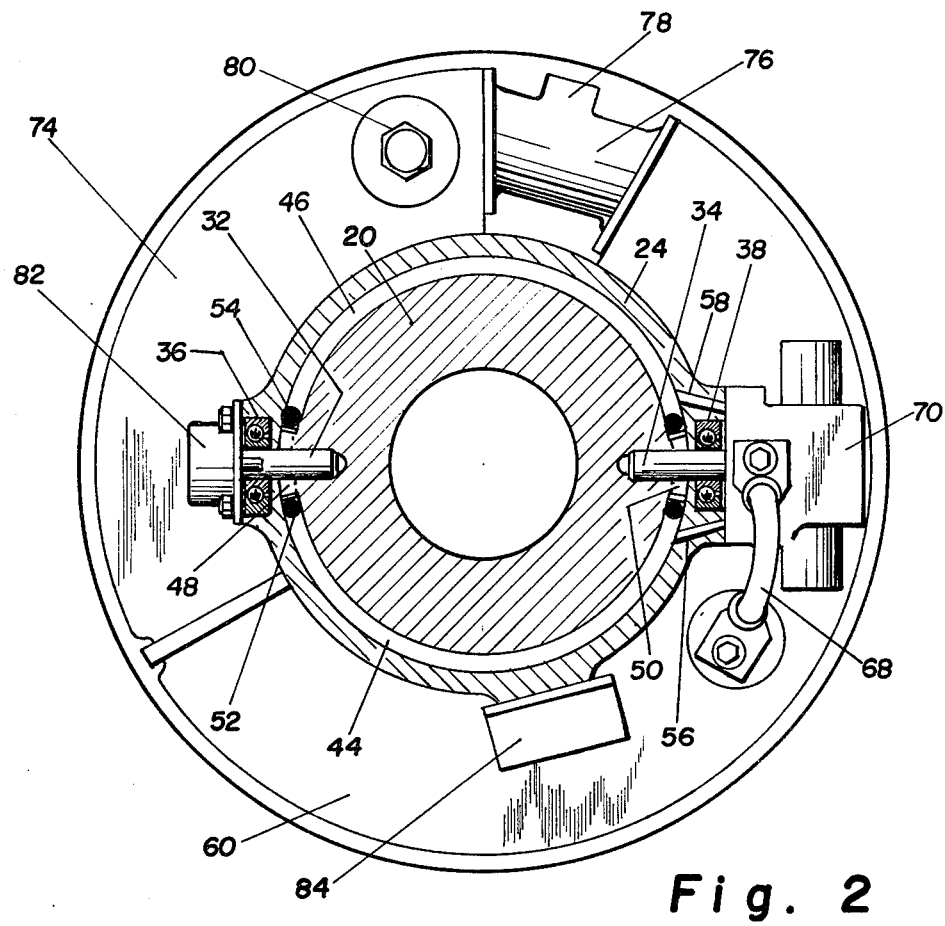
FIG. 2 is a cross sectional view of the rocket motor of FIG. 1 taken along the lines 2—2 in FIG. 1.
Figure 3:
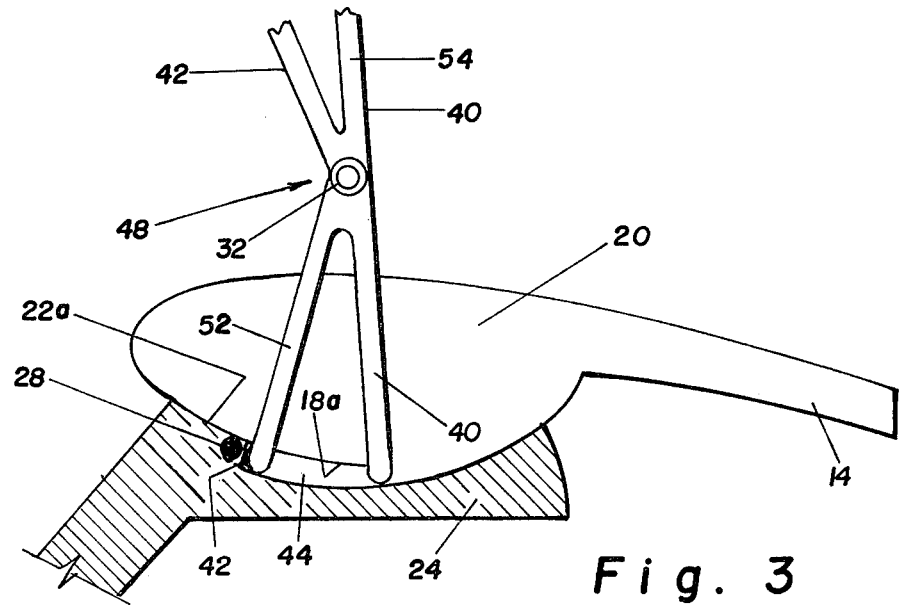
FIG. 3 is a schematic view, partly in section, of a portion of the spherical bearing of FIG. 1.

With particular reference to FIGS. 1-3, there is shown a solid propellant rocket motor designated generally by numeral 10 having a case 12, a solid propellant (not shown), and a single axis exhaust nozzle 14 mounted on case 12 by means of a spherical bearing or ball and socket joint indicated at 16. Spherical bearing 16 includes an externally rounded movable nozzle surface 18 that is formed on an inner race or ball 20 and a mating internally rounded or concave static surface 22 formed on an outer race or socket 24. Also formed on ball 20 and socket 24, respectively, are a rounded surface 18a and a concave surface 22a, which surfaces are both displaced radially inwardly with respect to ball 20. Surfaces 18a and 22a are concentric, the clearance space 26 between them being fully sealed by an annular seal 28. Seal 28 may be a semi-resilient O-ring or the like and is restrained from excessive motion or extrusion into the clearance space 26 by a groove or channel 30. The rounded surface 18a of ball 20 bears only on seal 28 and cannot touch surface 22a unless the seal 28 is abnormally compressed by lateral, or axial, imbalance of the load on ball 20.

Seal 28, however, is not required to support the thrust or blow off loads upon ignition and combustion of the solid propellant in motor 10, such loads being reacted on thrust pins and bearings, specifically oppositely disposed thrust pins or pivots 32 and 34 carried by ball 20 and oppositely disposed thrust bearings 36 and 38, respectively, that are provided on outer race or socket 24, being fixedly attached thereto.

As seen in FIGS. 1 and 3, the inward radial displacement of surface 18a with respect to surface 18 of ball 20 provides a wall or stop 40 that projects outwardly with respect to ball 20. Similarly, the inward radial displacement of surface 22a with respect to surface 22 of socket 24 provides a wall or stop 42 that projects radially inwardly with respect to socket 24. The walls 40 and 42 are relatively movable with respect to each other as ball 20 is rotated in socket 24, and together with surfaces 18a and 22a provide an annular expansible chamber that circumscribes the ball 20 in the region of the plane containing the thrust pins or pivots 32 and 34, bosses associated with the latter, as described hereinafter, effectively dividing the annular chamber into two separate semi-circular chambers as indicated at 44 and 46 in FIG. 2. The volume of one chamber 44 or 46 varies inversely with the volume of the other chamber as the ball 20 and thereby the nozzle 14 are rotated on the pivotal axis provided by pivots 32 and 34 in one direction or the other form a position wherein the nozzle 14 is in line with the axis of the rocket motor.

Located within each of chambers 44 and 46 is a closed loop kidney seal actuator, specifically a seal 52 in chamber 44 and a seal 54 in chamber 46. Each of the kidney seal actuators 52 and 54 is shaped in an arcuate form resembling a kidney or the like, as seen in FIG. 3, and is rounded in cross section. The looped ends of each actuator 52 and 54, as seen in FIG. 3, are restrained, one end of each of the actuators being fixedly attached to the boss 48 on ball 20 and the other end of each actuator being fixedly attached to the boss 50. Thus each of the actuators 52 and 54 is wrapped around approximately 180° of the inner race or ball 20 in each semi-circle.

As seen in FIG. 2, ports 56 and 58 are provided in the outer race or socket 24 adjacent the thrust bearing 38 for admitting pressurizing fluid to the chambers 44 and 46, respectively, and for venting fluid therefrom, thereby causing the respectively associated actuator 52 or 54 to expand and the other actuator to contract. It is noted that steel retainer bands are not required around the entire periphery of the kidney seals 52 or 54. This is for the reason that the walls 40 and 42 provided by the ball 20 and the socket 24, respectively, define the periphery of and restrain each of the actuators 52 and 54 at all times, the loop ends of each of the actuators 52 and 54 being permanently attached, as described, to the opposed bosses 48 and 50.

Upon actuation of the actuators 52 or 54, for example, upon an increase in fluid pressure in chamber 44, and a decrease in fluid pressure in chamber 46, the ball 20 and hence, nozzle 14 will be rotated counterclockwise parallel to the plane of the sheet of drawing, as seen in FIG. 1. Similarly, upon a decrease in fluid pressure in chamber 44, and an increase in fluid pressure in chamber 46, the ball 20 and nozzle 14 will be rotated clockwise parallel to the plane of the drawing. In each case the rotation of the ball 20 and nozzle 14 is about the pivotal axis provided by the thrust pins 32 and 34, as seen in FIG. 2.

If desired, the pressurizing fluid supply system for the actuation of the actuators 52 and 54 may be similar to that illustrated and described in my above-mentioned prior U.S. Pat. No. 3,912,172. In FIG. 1, however, there is illustrated a modification of that pressurizing fluid system wherein the source of the fluid pressure comprises a fluid tank indicated at 60 in FIGS. 1 and 2. Fluid tank 60 is formed by a compressible bladder 62 contained within a supporting housing 64, the bladder 62 and housing 64 extending for approximately two-thirds of the circumference around the forward end of the spherical bearing 16, immediately forward of thrust bearings 36 and 38, and being retained in position by a skirt 66 on the aft end of the case 12. The interior of the bladder 62 contains pressurized fluid such as Type A automotive hydraulic fluid and is connected by a supply tube indicated at 68 and a servovalve or solenoid actuated valve 70 to the kidney seal actuator ports 56 and 58. Upon command solenoid valve 70 is selectively actuated to allow pressurizing fluid to flow selectively to one or the other of the kidney seal actuating chambers 44 or 46.

For pressurizing the fluid in tank 60 there is provided a diffuser tube 72 positioned between flexible bladder 62 and housing 64, as seen in FIG. 1, diffuser tube 72 being connected to a supply of gas such as nitrogen produced by a gas generator indicated at 74 in FIG. 2, and having a plurality of small openings (not shown) through which the generated gas may diffuse to enter the region between tube 72 and bladder 62 thereby to effect compression of the bladder 62 and pressurizing of the fluid in tank 60. For regulating the pressure of the fluid in the tank 60, there is provided a pressure regulator 76, as seen in FIG. 2, pressure regulator being attached to one end of bladder 62 and connected to an over board dump 78 for exhausting pressurizing fluid from the bladder 62 as required to maintain the pressure of the fluid therein to a desired value.

The gas generator 74 includes an initiator/igniter 80 for initiating the generation of the fluid pressurizing gas when it is desired to effect the nozzle vectoring, or turning, of the thrust produced by the rocket motor 10. The gas generator 74 may be of any suitable type including a gas generating composition that is kindled by the initiator/igniter 80, and for example, may be of the type disclosed in U.S. Pat. No. 4,203,787 granted to George F. Kirchoff et al on May 20, 1980.

As described in my aforementioned prior U.S. Pat. No. 3,912,172, the nozzle movement necessary to change the thrust vector to steer the vehicle which the rocket motor 10 is propelling is controlled from a direction programmer or a similar automatic or manual means. Irrespective of the method of control, command signals are directed to the solenoid valve 70 which allows pressurized hydraulic fluid to flow to one or the other of the kidney seal actuating chamber 44 or 46.

A feedback electrical signal desirably is also provided, as derived, for example from a rotary potentiometer indicated at 82 in FIG. 2, to give information to an electronic control module, indicated at 84, as to the actual position of the ball 20 and nozzle 14 with respect to the rocket motor 10. When a command signal is given to alter the direction of the thrust vector, this signal is amplified by electronic module 84 as required to operate solenoid valve 70 causing it to allow pressurized fluid to flow from supply tube 68 through actuator port 56 or 58. As this occurs, kidney seal actuator chamber 44 or 46 expands, causing ball 20 and nozzle 14 to deflect in a corresponding direction, counterclockwise or clockwise, respectively. This action causes feedback potentiometer 82 to send an electrical signal back to the electronic module 84 where it is compared with the command signal and a determination is made automatically as to whether to continue the deflection of nozzle with respect to the rocket motor 10, to stop or to reverse the operation to provide the desired nozzle and resultant vector thrust direction.

FIGS. 4–7 of the drawings illustrate the application of the novel 180° kidney seal actuators of the present invention to provide for rocket motor omni-axial nozzle rotation, as distinguished from the single axis rotation provided by the structural arrangement of FIGS. 1–3. In FIGS. 4–7 a fluid source, actuator ports, servovalves, electronic module, and position feedback components have not been shown, but those skilled in the art will understand the application of such provisions and components for omni-axial nozzle rotation, particularly in view of the foregoing description given in connection with single axis nozzle rotation and the disclosure, also, of my aforementioned prior U.S. Pat. No. 3,912,172 which illustrates omni-axial nozzle rotation.

Figure 4:
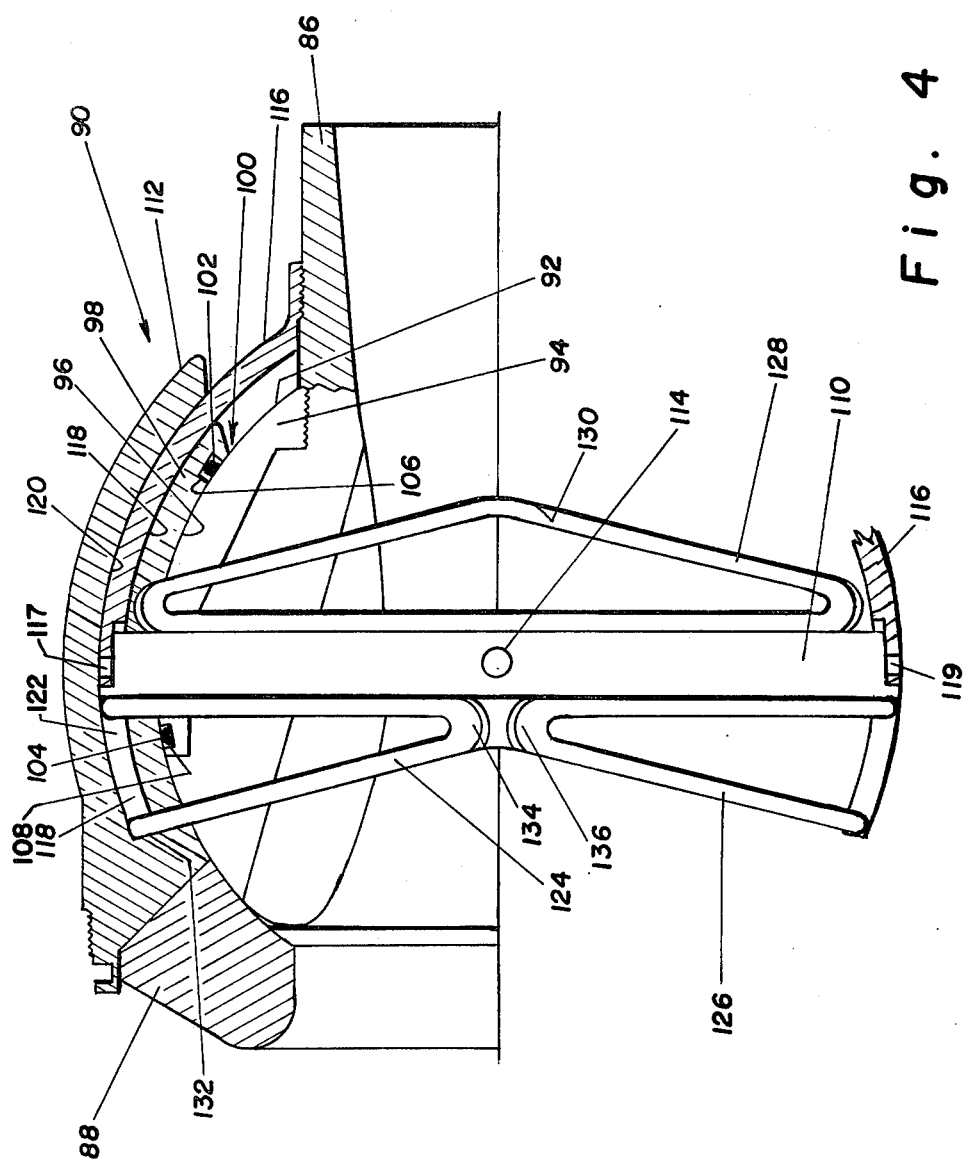
FIG. 4 is a schematic view, partly in section, illustrating the internal actuation spherical bearing of the present invention for omni-axial nozzle rotation, and represents a "see through" sketch of the hemisphere of the bearing above the plane of the drawing of the various components, the hemisphere of the bearing below the plane of the drawing that is out of view being a mirror image of that above the plane of the drawing.

There is shown in FIG. 4 an exhaust nozzle 86 mounted on the aft end of a rocket motor indicated at 88 by means of a spherical bearing 90. The spherical bearing 90 includes an externally rounded nozzle surface 92 that is formed by an inner race or ball 94 and a mating internally rounded static surface 96 that is formed on an outer race or socket 98. Surfaces 92 and 96 are concentric, the clearance space 100 between them being fully sealed by annular seals 102 and 104, each of which have the general form of an O-ring.

The nozzle blow off load is carried by a pressure lubrication system such as that disclosed in U.S. Pat. No. 3,912,172. Seal 102 is a semi-resilient lube seal, and is restrained from excessive motion or extrusion into the clearance space 100 by an annular groove or channel 106 that is formed in the surface 96 and in which seal 102 is positioned. If desired, seal 102 may be replaced by a lubricated tetrafluoroethylene pad.

Seal 104 is a split line seal and is located forward of the pivotal axis of the inner race or ball 94, being positioned in an annular groove 108 that is formed in the surface 92 of inner race or ball 94.

Normally, the external rounded surface 92 of inner race or ball 94 bears only on seals 102 and 104, out of touch with the surface 96 of the outer race, with touching of the surfaces 92 and 96 occurring only in the event the seal is compressed to an abnormal extent by imbalance of the thrust load on the nozzle.

Also provided in the structural arrangement of FIG. 4 are a gimbal ring 110 and a kidney seal or vector seal cover 112. Vector seal cover 112, as indicated, has the form of a partial spherical shell and partially embraces in a concentric manner the spherical bearing 90.

The pitch axis, indicated at 114, for the nozzle 86 is established by pinning the gimbal ring 110 on axis 114 by means of suitable pins and bearings (not shown) to the kidney seal cover 112. The gimbal ring is required to carry only the actuation loads, that is the loads for producing the desired omni-axial nozzle rotation, the nozzle blow off load being carried, as described above by the lube seals 102 and 104. The gimbal ring is carried by two pins that are supported by kidney seal cover 112 and are spaced apart 180° on the pitch axis 114.

For establishing the yaw axis for the FIG. 4 structure, which yaw axis is spaced 90° with respect to the pitch axis 114, there is provided an actuator shell indicated at 116 that is mounted on and is fixedly attached to the nozzle 86. The shell 116 and the gimbal ring 10 are pinned together at positions spaced 180° apart by pins 117 and 119 that extend through overlapping recessed portions of shell 116 and gimbal ring 110. Shell 116 similarly to the kidney seal cover 112, has the form of a partial spherical shell that is concentric with the outer surface 118 of outer race or socket 98 and the inner surface 120 of kidney seal cover 112, the arrangement being such that the actuator shell 116 and nozzle 86, also, are angularly movable with respect to the static surfaces 118 and 120.

It will be noted by reference to FIG. 4 that the angle subtended by the actuator shell 116 is substantially less than that subtended by the kidney seal cover 112, and as a consequence, there is formed between cover 112 and actuator shell 116 an annular chamber 122 that has the form of a portion of a sphere, the shape of the chamber varying in accordance with the deflection of the nozzle 86 from a position of alignment with the rocket motor.

Located within annular chamber 122 are the gimbal ring 110, a pitch down kidney seal actuator 124, a pitch up kidney seal actuator 126, a yaw right kidney seal actuator 128 and a yaw left kidney seal actuator (not shown) that is in the hemisphere of the spherical bearing that is out of view.

Figure 5:
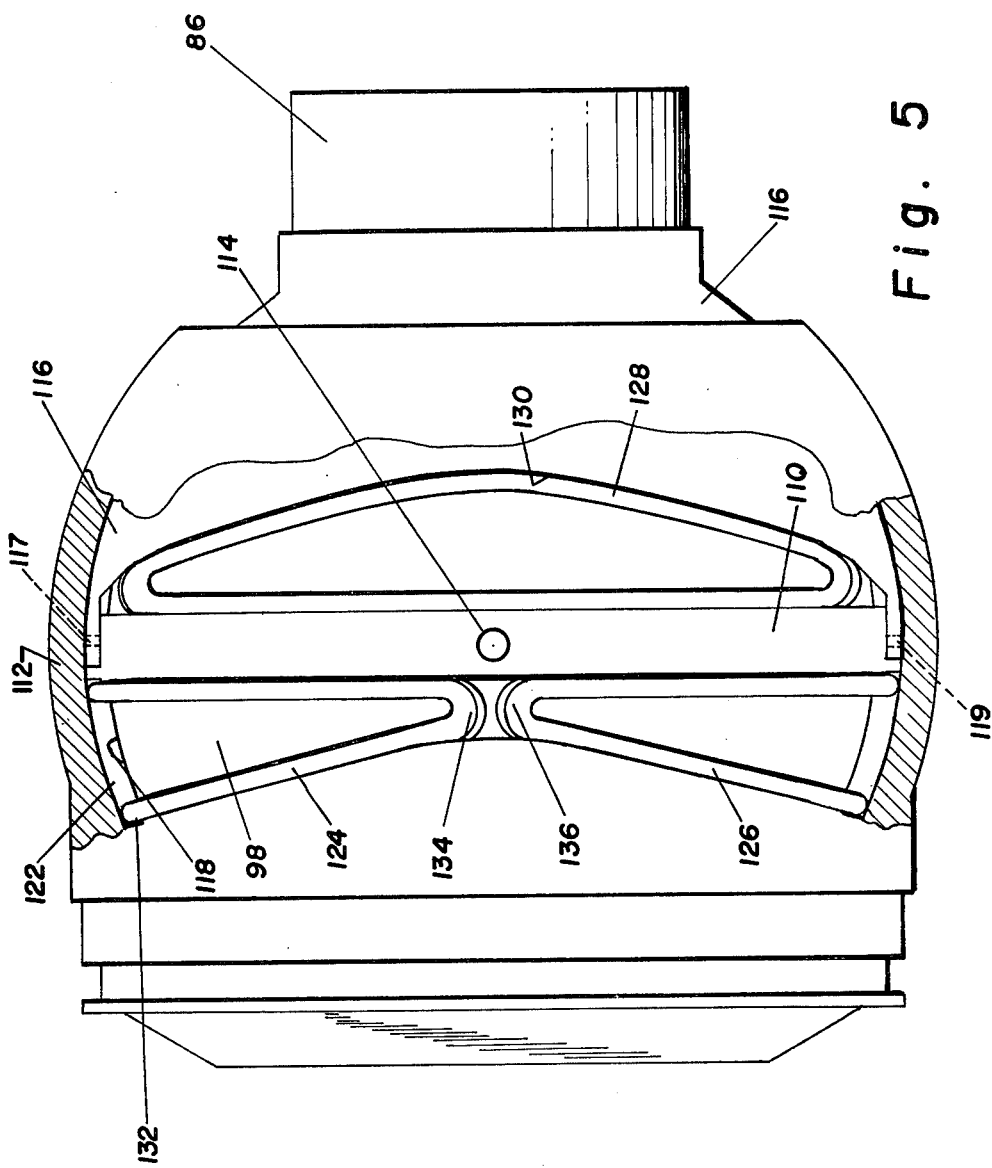
FIG. 5 is a view, partly in section, showing the actuating arrangement of the internal actuation spherical bearing of FIG. 4 with the vector seal cover cut away.

One wall of the annular chamber 122 is formed by the annular end wall 130 of the actuator shell 116, the shape of the wall 130 in each hemisphere, that is, the hemisphere facing out the drawing and that facing therein, also, being generally as shown in FIG. 4 by the outline of the right side of the yaw right kidney seal 128, though more rounded as indicated in FIG. 5. The wall 130 acts as a stop means for the right side of the kidney seal 128. The other side of the seal bears against the right side of the gimbal ring 110, as shown, that side of the gimbal 110 acting as a stop means. In FIG. 4 the kidney seal 128 is shown in a relaxed condition, that is, with no applied fluid pressure therein.

An opposed wall of the annular chamber 122 is comprised of an inwardly formed annular shoulder 132 on the kidney seal cover 112. The shape of wall 132 in each hemisphere is as shown in FIG. 4, one side of each of kidney seal actuators 124 and 126 bearing against wall 132, the wall 132 acting as a stop means, and the other side of each of kidney seal actuators 124 and 126 bearing against the left side of the gimbal ring 110, which left side of the gimbal 110 also acts as a stop means. The adjacent looped ends of kidney seal actuators 124 and 126 are restrained against movement, being attached to the left side of the gimbal ring 110, and to each other, if desired, adjacent the region of the pitch axis 114. The loop ends of the kidney seals 124 and 126 in the hemisphere visible in FIG. 4 are indicated at 134 and 136, respectively.

Similarly, the looped ends of the yaw right kidney seal actuator 128 and its counterpart yaw left kidney seal actuator (not shown) are restrained against movement relatively to gimbal 110, desirably being retained in position between the wall 130 of the actuator shell 116 and the right edge of gimbal ring 110, the latter components being pinned together.

Figure 7:
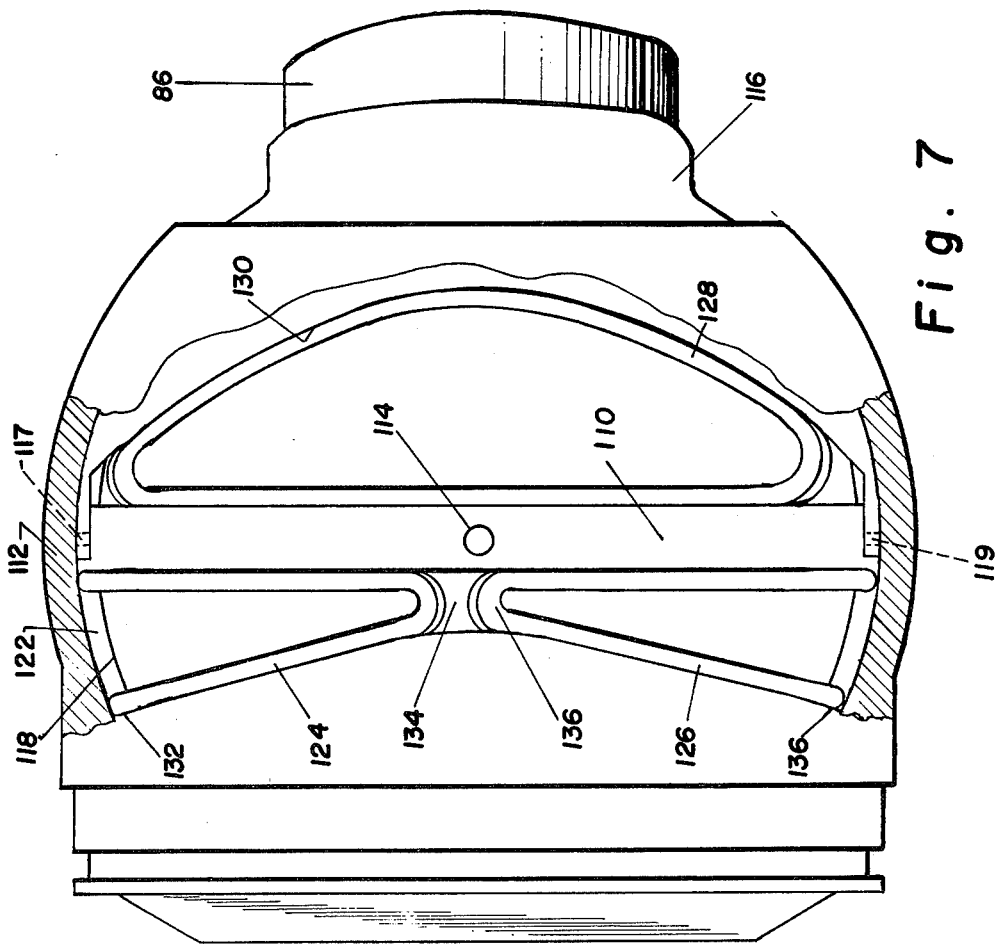
FIG. 7 is a view similar to FIG. 5 but showing the yaw kidney seal pressurized-vectoring the nozzle into the plane of the drawing.

The manner of pressurization of the pitch and yaw kidney seal actuators in the omni-axial structure of FIG. 4 generally is the same as that illustrated and described with reference to the single axis structure of FIGS. 1–3, suitable pressurizing and venting ports (not shown) being provided for the selective actuation of each of the pitch up, pitch down, yaw right and yaw left kidney seal actuators. In the drawings, FIG. 5 shows all of the actuators as having pressure therein but disposed in their null position. FIG. 6 shows the pitch up actuator 126 as pressurized. FIG. 7 shows the yaw right actuator 128 as pressurized.

As noted hereinbefore, two servocontrol loops are required to be employed with the omni-axial structure illustrated in FIGS. 4–7, one for pitch and one for yaw. The control ports of the pitch servovalve communicate with the two kidney seal actuators 124 and 126 forward of the gimbal ring 110, and the yaw servovalve communicates with the two kidney seal actuators aft of the gimbal ring 110, the yaw right actuator 128 of which is shown, the other or yaw left actuator being out of view. The servovalves, amplifier, and position feedback components are not illustrated inasmuch as these components form no part of the present invention.

FIG. 5 shows the kidney seal arrangement of the internal actuated spherical bearing with the vector seal cover 112 cut away, the pitch and yaw actuators being shown in their null position with equal pressure in all kidney seals.

FIG. 6 shows the nozzle pitched up by pressurizing the lower pitch kidney seal and venting the upper seal. Note the yaw kidney seals rotate in-total with the actuator shell and gimbal ring during pitch maneuvering of the nozzle.

FIG. 7 shows the yaw kidney seal pressurized—vectoring the nozzle into the plane of the paper. Note the pitch kidney seals are not displaced by yaw maneuvering.

Figure 8:
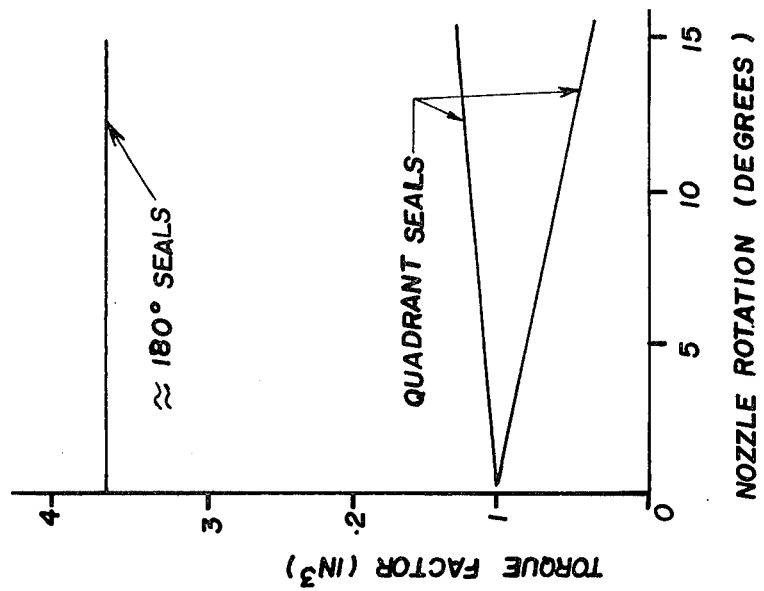
FIG. 8 is a graph comparing torque factor plotted against nozzle rotation for the 180° kidney seals of the present invention and the quadrant kidney seals of the prior art.

An important advantage of the novel structure according to the present invention is illustrated by the torque factor curves of FIG. 8. The increase in torque factor obtained by the use of the structural embodiments of the present invention makes possible the elimination of the lubrication system at the inner/outer race interface of the prior art structures and to support the inner race on a lubricated tetrafluoroethylene pad (not shown), a distinct advantage from a number of standpoints in rocket propulsion systems, particularly, where lighter weight, simplicity, economy, and greater torque independent of bearing rotation are important considerations and/or requirements.

Thus, there has been provided according to the present invention an improved internally actuated spherical bearing having particular utility for rocket motor single axis-rotation nozzles and also omni-axial nozzle rotation, that renders maximum developed torque independent of bearing rotation, that for omni-axial nozzle rotation permits the inner race to be supported on a lubricated tetrafluoroethylene pad enabling the elimination of a two seal lubrication system of the prior art (shown in FIG. 4), that allows rotation of the bearing through 90° or more, particularly where hot gases are not passed through the bearing, and which features elimination of the prior art steel retainer bands for the kidney seal actuators and attendant stress problems introduced by the use of such bands, and additionally, for single axis-rotation nozzles enables the nozzle blow off loads to be reacted on thrust pins and bearings.

What is claimed is:

1. An internally actuated spherical bearing comprising
   an outer race,
   an inner race positioned for rotation, about an axis, within said outer race,
   means for providing an annular chamber around said inner race, said chamber having opposed relatively movable edge walls which are fixedly attached, respectively, to said outer race and said inner race, and
   first and second elongated expansible loop seal actuators, each of said actuators having a pair of ends and arranged in end-to-end relation within said chamber, with each actuator wrapped around approximately 180° of the inner race in each semi-circle, and with each of the pairs of adjacent ends of said actuators being positioned proximate the axis of said inner race.

2. An internally actuated spherical bearing as specified in claim 1 wherein each of said first and second actuators includes a pair of elongated sides, with one side of each pair abutting one of the opposed edge walls of said chamber and the other side of each pair abutting the other of the opposed edge walls of said chamber, whereby each of said actuators encloses a variable sealed space with one of said sealed spaces wrapped around one half of said inner race and the other of said sealed spaces wrapped around the other half of said inner race.

3. An internally actuated spherical bearing as specified in claim 2 including means for the selective application of fluid pressure to each of said variable spaces.

4. An internally actuated spherical bearing as specified in claim 2 wherein said inner race is supported for rotation on said axis by seal means provided between said inner race and said outer race.

5. An internally actuated spherical bearing comprising an outer race,
   an inner race positioned for rotation, about an axis, within said outer race,
   means for providing an annular chamber around said inner race, said chamber having opposed relatively movable edge walls which are fixedly attached, respectively, to said outer race and said inner race, and
   first and second elongated expansible loop seal actuators, each of said actuators having a pair of ends and arranged in end-to-end relation within said chamber, with each actuator wrapped around approximately 180° of the inner race in each semi-circle, and with each of the pairs of adjacent ends of said actuators being positioned proximate the axis of said inner race,
   wherein each of said first and second actuators includes a pair of elongated sides, with one side of each pair abutting one of the opposed edge walls of said chamber and the other side of each pair abutting the other of the opposed edge walls of said chamber, whereby each of said actuators encloses a variable sealed space with one of said sealed spaces wrapped around one half of said inner race and the other of said sealed spaces wrapped around the other half of said inner race,
   wherein said inner race is supported for rotation on said axis by seal means provided between said inner race and said outer race, and
   wherein said means for providing said annular chamber includes a cover for said first and second actuators, and further includes a gimbal ring and an actuator shell, said gimbal ring being pinned to said cover for rotation relative thereto, said actuator shell being fixedly attached to said inner race, said gimbal ring and actuator shell being positioned between said cover and said outer race with said gimbal ring being pinned to said actuator shell and positioned between said actuator shell and said first and second actuators.

6. An internally actuated spherical bearing as specified in claim 5 further including third and fourth elongated expansible peripheral loop seal actuators, said third and fourth actuators being provided in end-to-end relation within said annular chamber with each of the pairs of adjacent ends of said third and fourth actuators being displaced approximately 90° around said gimbal ring from the position at which said gimbal ring is pinned to said cover, said third and fourth actuators being positioned between said gimbal ring and said actuator shell.

7. An internally actuated spherical bearing as specified in claim 6 wherein each of said third and fourth actuators includes a pair of elongated sides with one side of each pair abutting said gimbal ring and the other side of each pair abutting said actuator shell, whereby each of said third and fourth actuators encloses a variable sealed space wrapped around one side of said inner race and the other of said sealed spaces wrapped around the other side of the inner race, each of said last mentioned variable sealed spaces being displaced approximately 90° with respect to each of the variable sealed spaces enclosed by said first and second actuators.

8. An internally actuated spherical bearing as specified in claim 7 including means for the selective application of fluid pressure to each of said variable sealed spaces.

9. An internally actuated spherical bearing comprising
   an outer race,
   an inner race positioned for rotation about an axis within said outer race,
   means for providing an annular chamber around said inner race, said chamber having opposed relatively movable edge walls which are fixedly attached, respectively, to said outer race and said inner race, and
   first and second elongated expansible loop seal actuators, each of said actuators having a pair of ends and arranged in end-to-end relation within said chamber, with each actuator wrapped around approximately 180° of the inner race in each semi-circle, and with each of the pairs of adjacent ends of said actuators being positioned proximate the axis of said inner race,
   wherein each of said first and second actuators includes a pair of elongated sides with one side of each pair abutting one of the opposed edge walls of said chamber and the other side of each pair abutting the other of the opposed edge walls of said chamber, whereby each of said actuators encloses a variable sealed space with one of said sealed spaces wrapped around one half of said inner race and the other of said sealed spaces wrapped around the other half of said inner race, wherein the opposed edge walls of the chamber are formed, respectively, by a stepped portion of each of said inner and outer races, and wherein the axis of rotation of said inner race is provided by oppositely disposed pivot pins carried by said inner race and cooperating berings fixedly attached to said outer race.

10. An internally actuated spherical bearing comprising an outer race, an inner race positioned for rotation about an axis within said outer race, means for providing an annular chamber around said inner race, said chamber having opposed relatively movable edge walls which are fixedly attached, respectively, to said outer race and said inner race, and first and second elongated expansible loop seal actuators, each of said actuators having a pair of ends and arranged in end-to-end relation within said chamber, with each actuator wrapped around approximately 180° of the inner race in each semi-circle, with each of the pairs of adjacent ends of said actuators being positioned proximate the axis of said inner race, wherein each of said first and second actuators includes a pair of elongated sides with one side of each pair abutting one of the opposed edge walls of said chamber and the other side of each pair abutting the other of the opposed edge walls of said chamber, whereby each of said actuators encloses a variable sealed space with one of said sealed spaces wrapped around one half of said inner race and the other of said sealed spaces wrapped around the other half of said inner race, wherein said inner race is supported for rotation on said axis by seal means provided between said inner race and said outer race, wherein said means for providing said annular chamber includes a cover for said first and second actuators, and further including a gimbal ring and an actuator shell, said gimbal ring being pinned to said cover for rotation relative thereto, said actuator shell being fixedly attached to said inner race, said gimbal ring and actuator shell being positioned between said cover and said outer race with said gimbal ring being pinned to said actuator shell and positioned between said actuator ring and said first and second actuators, further including third and fourth elongated expansible peripheral loop seal actuators said third and fourth actuators being provided in end-to-end relation within said annular chamber with each of the pairs of adjacent ends of said third and fourth actuators being displaced approximately 90° around said gimbal ring from the position at which said gimbal ring is pinned to said cover, said third and fourth actuators being positioned between said gimbal ring and said actuator shell, wherein each of said third and fourth actuators includes a pair of elongated sides with one side of each pair abutting said gimbal ring and the other side of each pair abutting said actuator shell, whereby each of said third and fourth actuators encloses a variable sealed space wrapped around one side of said inner race and the other of said sealed spaces wrapped around the other side of the inner race, each of said last mentioned variable sealed spaces being displaced approximately 90° with respect to each of the variable sealed spaces enclosed by said first and second actuators, and further including means for the selective application of fluid pressure to each of said sealed spaces.

11. An improved internally actuated spherical bearing for the attachment of a steerable exhaust nozzle to the combustion chamber of a rocket motor including an outer race that is fixedly attached to the rocket motor, an inner race positioned about an axis within said outer race, said inner race comprising an externally rounded movable surface of the nozzle, means for providing an annular chamber around said inner race, said annular chamber having opposed relatively movable edge walls which are fixedly attached, respectively, to said outer race and said inner race, and first and second elongated expansible loop seal actuators each of said actuators having a pair of ends and said actuators being arranged in end-to-end relation within said chamber, with each actuator wrapped around approximately 180° of the inner race in each semi-circle, with each of the pairs of adjacent ends of said actuators being positioned proximate the axis of said inner race.

12. An improved internally actuated spherical bearing as specified in claim 11 wherein each of said first and second actuators includes a pair of elongated sides, with one side of each pair abutting one of the opposed edge walls of said chamber and the other side of each pair abutting the other of the opposed edge walls of said chamber, whereby each of said actuators encloses a variable sealed space with one of said sealed spaces wrapped around one half of said inner race and the other of said sealed spaces wrapped around the other half of said inner race.

13. An improved internally actuated spherical bearing as specified in claim 12 further including means for the selective application of fluid pressure to each of said variable spaces, said means including an actuator port communicating with each of said sealed spaces, a supply tube having a connection to a source of fluid pressure, and valve means connected between said supply tube and said actuator ports.

* * * * *